US012737170B2

(12) United States Patent
Miyazawa et al.

(10) Patent No.: US 12,737,170 B2
(45) Date of Patent: Sep. 15, 2026

(54) SOFTWARE MANAGEMENT SYSTEM FOR VEHICLE, SOFTWARE MANAGEMENT METHOD FOR VEHICLE, AND NON-TRANSITORY STORAGE MEDIUM

(71) Applicant: TOYOTA JIDOSHA KABUSHIKI KAISHA, Toyota (JP)

(72) Inventors: Tomoaki Miyazawa, Nagoya (JP); Ryota Nakabayashi, Nagoya (JP); Naoki Yomoda, Toyota (JP); Atsushi Mori, Miyoshi (JP); Hiroshi Inoue, Nagoya (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 18/585,278

(22) Filed: Feb. 23, 2024

(65) Prior Publication Data

US 2024/0296040 A1 Sep. 5, 2024

(30) Foreign Application Priority Data

Mar. 3, 2023 (JP) ................................ 2023-032890

(51) Int. Cl.
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 2005/0256614 | A1* | 11/2005 | Habermas | B60L 3/0023 701/1 |
| 2016/0335073 | A1* | 11/2016 | Hong | H04L 67/06 |
| 2018/0307477 | A1* | 10/2018 | Hong | H04L 67/12 |
| 2019/0034194 | A1* | 1/2019 | Fox | G06F 11/1433 |
| 2019/0208451 | A1* | 7/2019 | Lei | H04W 36/324 |
| 2019/0258467 | A1* | 8/2019 | Frantz | G01C 21/3691 |
| 2020/0008122 | A1* | 1/2020 | Radko | H04W 76/15 |
| 2020/0125355 | A1 | 4/2020 | Aust | |
| 2021/0127432 | A1* | 4/2021 | Nishizaki | H04W 88/04 |

(Continued)

FOREIGN PATENT DOCUMENTS

| | | | |
|---|---|---|---|
| JP | 4655955 | B2 | 3/2011 |
| JP | 6888845 | B2 | 6/2021 |
| JP | 2022-062548 | A | 4/2022 |

OTHER PUBLICATIONS

Steger, "An Efficient and Secure Automotive Wireless Software Update Framework", 2018, IEEE (Year: 2018).*

(Continued)

*Primary Examiner* — Hossain M Morshed
(74) *Attorney, Agent, or Firm* — Oliff PLC

(57) ABSTRACT

A software management system is a system for a vehicle including a first communication device configured to receive update data of software via a wireless LAN, and a second communication device configured to receive the update data via a cellular line. The software management system includes a processing circuit configured to select which of the first communication device and the second communication device to use to receive the update data, based on a traveling circumstance of the vehicle.

10 Claims, 2 Drawing Sheets

(56) References Cited

U.S. PATENT DOCUMENTS

| | | | | |
|---|---|---|---|---|
| 2021/0294578 | A1* | 9/2021 | Noguchi | B60W 50/00 |
| 2022/0253300 | A1* | 8/2022 | Yamada | G06F 8/65 |
| 2023/0077201 | A1* | 3/2023 | Kang | H04B 1/52 |
| 2023/0199636 | A1 | 6/2023 | Hoshino | |
| 2023/0232271 | A1* | 7/2023 | Kawai | H04L 47/22 370/329 |
| 2024/0296041 | A1* | 9/2024 | Miyazawa | G06F 8/65 |

OTHER PUBLICATIONS

Song, "Network Selection in an Integrated Wireless LAN and UMTS Environment Using Mathematical Modeling and Computing Techniques", 2005, IEEE (Year: 2005).*

* cited by examiner

SOFTWARE MANAGEMENT SYSTEM FOR VEHICLE, SOFTWARE MANAGEMENT METHOD FOR VEHICLE, AND NON-TRANSITORY STORAGE MEDIUM

CROSS-REFERENCE TO RELATED APPLICATION

This application claims priority to Japanese Patent Application No. 2023-032890 filed on Mar. 3, 2023 incorporated herein by reference in its entirety.

BACKGROUND

1. Technical Field

The disclosure relates to a software management system for a vehicle, a software management method for a vehicle, and a non-transitory storage medium.

2. Description of Related Art

In a software management system for a vehicle that is described in Japanese Patent No. 6,888,845, upon receiving a wake-up request from a wireless access point, a communication unit transitions from a sleep state to a wake-up state, and begins wireless communication with an external device. Software of electronic equipment is then updated with update data that is downloaded from the external device.

SUMMARY

When receiving update data via a cellular line, the likelihood that the connection to the cellular line will be disconnected when the vehicle relocates is small, but fees may be incurred. On the other hand, when receiving update data via a wireless LAN, there is a likelihood that the connection with the wireless LAN will be disconnected when the vehicle relocates. Accordingly, improving user convenience by appropriately selecting which of the cellular line and the wireless LAN to use to receive update data is desired.

A software management system according to a first aspect of the present disclosure is a system for a vehicle including a first communication device configured to receive update data of software via a wireless LAN, and a second communication device configured to receive the update data via a cellular line. This software management system includes a processing circuit configured to select which of the first communication device and the second communication device to use to receive the update data, based on a traveling circumstance of the vehicle.

According to a second aspect of the present disclosure, a software management method for a vehicle is a software management method that is executed by a processing circuit, and is a software management method for a vehicle that includes a first communication device configured to receive update data of software via a wireless LAN, and a second communication device configured to receive the update data via a cellular line. This software management method includes selecting which of the first communication device and the second communication device to use to receive the update data, based on a traveling circumstance of the vehicle.

According to a third aspect of the present disclosure, a non-transitory storage medium stores instructions that are executable by a processing circuit and that cause the processing circuit to perform functions for managing software of a vehicle including a first communication device configured to receive update data of the software via a wireless LAN and a second communication device configured to receive the update data via a cellular line. The functions include selecting which of the first communication device and the second communication device to use to receive the update data, based on a traveling circumstance of the vehicle.

Which of the cellular line and the wireless LAN to use to receive update data is appropriately selected based on the traveling circumstances of the vehicle, thereby improving convenience for the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
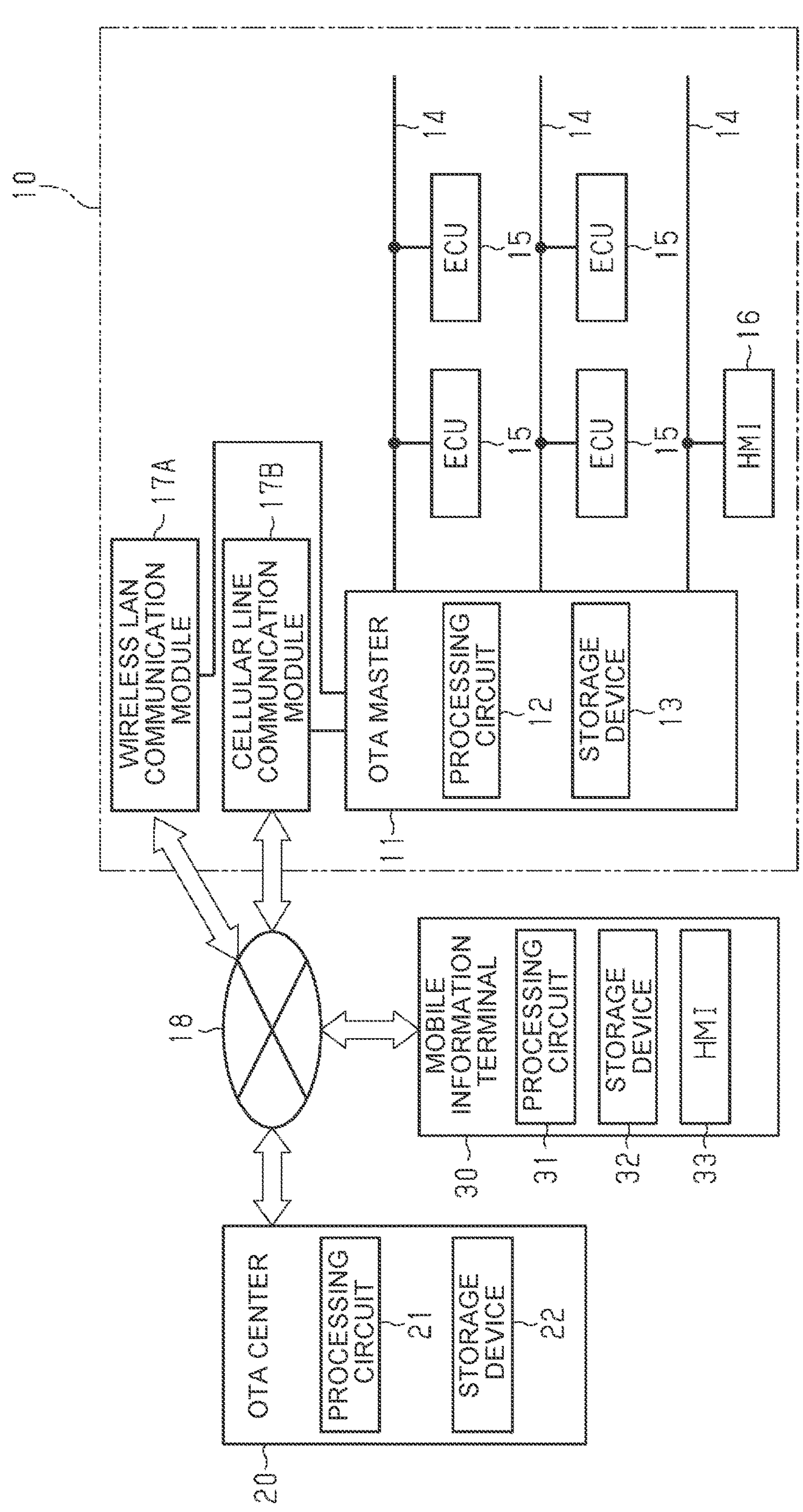
FIG. 1 is a diagram schematically illustrating a configuration of a software management system according to an embodiment.

Hereinafter, an embodiment of a software management system for a vehicle, a software management method for a vehicle, and a software management program for a vehicle, will be described with reference to FIGS. 1 and 2.

Configuration of Software Management System

First, a configuration of the software management system for the vehicle according to the present embodiment will be described with reference to FIG. 1. The software management system according to the present embodiment is a system that manages software of a vehicle 10.

The vehicle 10 is equipped with various types of electronic control units (ECUs) 15 that control various parts of the vehicle 10, and an over-the-air (OTA) master 11 that manages software updates in the vehicle 10. Examples of the ECUs 15 include an engine ECU, a transmission ECU, a brake ECU, an advanced driver assistance ECU, and a multimedia ECU.

The OTA master 11 includes a processing circuit 12 and a storage device 13. The storage device 13 stores, in advance, a program for management of software updates. The OTA master 11 is configured to perform processing related to management of software updates by the processing circuit 12 reading and executing the program stored in the storage device 13.

A wireless LAN communication module 17A, which is a first communication device for communicating with an external network 18 constructed outside of the vehicle 10, is connected to the OTA master 11. The wireless LAN communication module 17A receives update data for software via wireless LAN. The wireless LAN according to the present embodiment is a LAN that performs Wi-Fi (registered trademark) communication.

Also, a cellular line communication module 17B, which is a second communication device for communicating with the external network 18, is connected to the OTA master 11. The cellular line communication module 17B receives update data for software via a cellular line, which is a mobile communication network.

The vehicle 10 is equipped with a human-machine interface (HMI) 16. The HMI 16 includes an input device that receives operations from an occupant, and an output device that presents information to the occupant through images and audio. The HMI 16 according to the present embodiment has automotive navigation system functions for guiding over a traveling route of the vehicle 10. The OTA master 11, the ECUs 15, and the HMI 16 are configured to be capable of communicating with each other via in-vehicle communication lines 14.

Software updates in the vehicle 10 are performed based on update data distributed from an OTA center 20 over the external network 18, or the like. The OTA center 20 is a server device that includes a processing circuit 21 and a storage device 22. The OTA center 20 is configured to be capable of communicating externally via the external network 18.

The OTA center 20 is configured to be able to also mutually communicate with a mobile information terminal 30 of a user of the vehicle 10, via the external network 18 or the like. The mobile information terminal 30 includes a processing circuit 31, a storage device 32, and an HMI 33. The processing circuit 31 reads and executes programs stored in the storage device 32. The programs stored in the storage device 32 include a program for vehicle management. The mobile information terminal 30 is capable of communicating with the wireless LAN communication module 17A by tethering.

Preparation Processing for Software Update

Next, processing for preparing for software update in the vehicle 10 will be described. Here, a case in which software of one of the ECUs 15 installed the vehicle 10 is updated will be described as an example. Note, however, that objects of software updates may be in-vehicle electronic equipment other than the ECUs 15, such as the HMI 16, sensors, and so forth.

Software updating is performed after preparation is complete. Preparation for software updating is carried out through a download phase and an installation phase. In the download phase, update data for the software is downloaded from the OTA center 20 to the OTA master 11. In the download phase, the OTA master 11 receives the update data for the software from the OTA center 20. The OTA master 11 then stores the received update data in the storage device 13. The download phase includes a series of processing related to downloading, such as determining whether downloading is executable, verifying update data, and so forth. The update data transmitted from the OTA center 20 to the OTA master 11 may contain any of update software, compressed data in which the update software has been compressed, and divided data in which the update software or compressed data has been divided. Also, the update data may include an identifier of the in-vehicle electronic equipment to be updated, and an identifier of the software before the update. The update data is downloaded as a distribution package. The distribution package includes update data for one or a plurality of in-vehicle electronic equipment.

In the installation phase, updated software is written to the in-vehicle electronic equipment to be updated. In the installation phase, the OTA master 11 writes the update software to non-volatile memory of the ECU 15 to be updated. The installation phase includes a series of processing related to installation, such as determining whether installation is executable, transferring update data, verifying update software, and so forth. When the update data includes the update software itself, the OTA master 11 transfers the update data to the in-vehicle electronic equipment to be updated in the installation phase. When the update data contains compressed data, difference data, or divided data, of the update software, generating processing for generating update software from the update data is performed. The generating processing may be performed by the OTA master 11 or may be performed by the in-vehicle electronic equipment to be updated. Generating of the update software can be performed by decompressing compressed data, or assembling difference data or divided data.

After the installation phase is completed, a scheduled start time is set for the software update. Setting of the scheduled start time is performed, for example, by the following procedures. When update preparation is completed, the OTA master 11 causes the HMI 16 to display a setting screen for the scheduled start time. Upon the user of the vehicle 10 setting the scheduled start time at the HMI 16 on which the setting screen is displayed, the HMI 16 transmits the scheduled start time set by the user to the OTA master 11. The OTA master 11 stores the scheduled start time received from the HMI 16 in the storage device 13.

Such setting of the scheduled start time may be performed at the mobile information terminal 30. In this case, the scheduled start time set by the user at the mobile information terminal 30 is transmitted to the OTA master 11 of the vehicle 10 via the OTA center 20.

Update Processing for Software

Next, update processing for software will be described. The update processing is processing of switching the in-vehicle electronic equipment to be updated from a state of operating using the software before the update, to a state of operating using the software after the update.

When the scheduled start time set by the user arrives, the OTA master 11 determines whether execution conditions for activation are met. Execution conditions are individually set for each type of in-vehicle electronic equipment and update software. For example, in the case of in-vehicle electronic equipment such as the engine ECU, the transmission ECU, the brake ECU, or the like, that performs control necessary for the vehicle 10 to travel, the execution conditions for software update include that the vehicle 10 is not traveling.

When the execution conditions are not met, the OTA master 11 suspends execution of the update processing, and thereupon requests resetting of the scheduled start time. When the execution conditions are met, the OTA master 11 starts the update processing. During the update processing, the OTA master 11 instructs the in-vehicle electronic equipment to be updated to activate the updated software. The in-vehicle electronic equipment to be updated performs activation in accordance with this instruction. The update processing includes a series of processing related to activation, such as verification of execution results of activation, and so forth.

Communication Module Selection Processing

The OTA master 11 executes selection processing to select which of the wireless LAN communication module 17A and the cellular line communication module 17B to use to receive update data. In the selection process, when there is a reception request for update data, the OTA master 11 acquires parameters necessary for such selection, and selects the communication line that is optimal from the perspective of communication state, economic performance, and so forth. Then, the OTA master 11 selects a communication module corresponding to the selected communication line and receives the update data.

Figure 2:
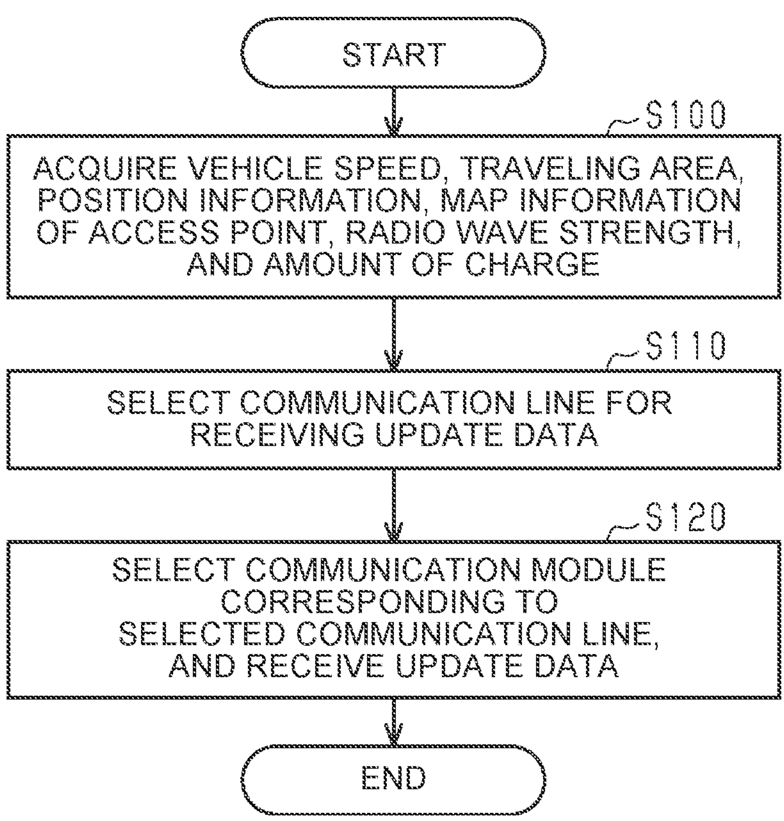
FIG. 2 is a flowchart of a selecting routine executed by the software management system.

FIG. 2 shows a flowchart of a selection routine executed by the OTA master 11 for the selection processing. When there is a reception request for update data, the OTA master

11 repeatedly executes the same routine at every predetermined control cycle. Note that hereinafter, a step number of each processing is represented by a number prefixed with the letter "S".

When the present routine is started, the OTA master 11 first acquires parameters indicating traveling circumstances of the vehicle 10 in S100. The parameters indicating the traveling circumstances are vehicle speed of the vehicle 10, a traveling area in which the vehicle 10 is traveling, the current position information of the vehicle 10, and the map information of the access point for wireless LAN that is currently connected to. Also, in S100, the OTA master 11 acquires the current radio wave strength of the wireless LAN and the current radio wave strength of the cellular line. Also, when the update data is received via the wireless LAN by tethering of the mobile information terminal 30, the OTA master 11 acquires an amount of charge of the mobile information terminal 30 in S100. The OTA master 11 acquires the vehicle speed based on a detection value of a vehicle speed sensor of the vehicle 10, for example. The OTA master 11 acquires the traveling area, the position information, and the map information of the access point for the wireless LAN, from the HMI 16, for example. The OTA master 11 acquires the radio wave strength of the wireless LAN from the wireless LAN communication module 17A, for example, and also acquires the radio wave strength of the cellular line from the cellular line communication module 17B. The OTA master 11 acquires the amount of charge of the mobile information terminal 30 through communication with the mobile information terminal 30 with which tethering is performed.

Next, the OTA master 11 selects a communication line for receiving update data based on each parameter acquired in S100 (S110).

The OTA master 11 basically selects the wireless LAN as the communication line for receiving update data, from a perspective of economic performance and so forth. However, in the following cases, the OTA master 11 selects the cellular line in order to prioritize stability of communication.

That is to say, when the vehicle speed is no lower than a predetermined threshold value, there is a likelihood that the connection with the wireless LAN will be disconnected, and accordingly the OTA master 11 selects the cellular line.

Also, depending on the traveling area of the vehicle 10, it is highly likely that the connection with the wireless LAN will be disconnected. Accordingly, when the position information of the vehicle 10 is within such a traveling area, regarding which there is a likelihood of the connection with the wireless LAN being disconnected, the OTA master 11 selects the cellular line.

Also, when the position information of the vehicle 10 becomes distanced from the access point for wireless LAN indicated in the map information, the likelihood that the connection with the wireless LAN will be disconnected becomes high. Therefore, the OTA master 11 selects a cellular line when the position information of the vehicle 10 is distanced from the map information of the access point for the wireless LAN by a predetermined value or more.

Also, when receiving update data, communication will be more stable when a communication line that has a strong radio wave strength is selected. Accordingly, the OTA master 11 compares the radio wave strength of the wireless LAN and the radio wave strength of the cellular line. The OTA master 11 then selects the communication line with the stronger radio wave strength. Note that even when the radio wave strength of the wireless LAN is weaker than the radio wave strength of the cellular line, communication by the wireless LAN is stable as long as the radio wave strength of the wireless LAN is no lower than a predetermined threshold value. Accordingly, even when the radio wave strength of the wireless LAN is weaker than the radio wave strength of the cellular line, the wireless LAN may be selected as the communication line, as long as the radio wave strength of the wireless LAN is no lower than a predetermined threshold value.

Also, when the amount of charge of the mobile information terminal 30 drops when reception of update data via wireless LAN is being performed by tethering of the mobile information terminal 30, the likelihood that the tethering will be interrupted is high, and there is a likelihood of the connection with the wireless LAN being disconnected. Accordingly, the OTA master 11 selects the cellular line when the amount of charge of the mobile information terminal 30 is no more than the predetermined value.

After selecting a communication line for receiving update data in S110, the OTA master 11 then selects a communication module corresponding to the selected communication line to receive the update data (S120). When the selected communication line is the wireless LAN, in S120 the OTA master 11 selects the wireless LAN communication module 17A as the communication module to receive the update data. When the selected communication line is the cellular line, in S120 the OTA master 11 selects the cellular line communication module 17B as the communication module to receive the update data.

When ending the processing of S120, the OTA master 11 then ends the execution of the present processing in the present control cycle.

Operations and Effects

Operations and effects of the present embodiment will be described.

(1) The OTA master 11 selects which of the wireless LAN communication module 17A and the cellular line communication module 17B to use to receive update data for the software based on the traveling circumstances of the vehicle 10. Accordingly, which of the wireless LAN and the cellular line to use to receive update data is appropriately selected based on the traveling circumstances of the vehicle 10, thereby improving convenience for the user.

(2) There is a likelihood that the connection with the wireless LAN will be disconnected when the vehicle speed is high, and accordingly vehicle speed can be used as a parameter when selecting which of the wireless LAN communication module 17A and the cellular line communication module 17B to use to receive update data. Thus, the OTA master 11 acquires the vehicle speed of the vehicle 10 as the traveling circumstances of the vehicle 10. Accordingly, the communication module for receiving update data can be appropriately selected.

(3) Depending on the traveling area of the vehicle 10, there is a likelihood that the connection with the wireless LAN will be disconnected. Accordingly, the traveling area can be used as a parameter when selecting which of the wireless LAN communication module 17A and the cellular line communication module 17B to use to receive update data. Thus, the OTA master 11 acquires the traveling area of the vehicle 10 as the traveling circumstances of the vehicle 10. Accordingly, the communication module for receiving update data can be appropriately selected.

(4) When the position of the vehicle 10 becomes distanced from the access point for the wireless LAN indicated in the map information, there is a likelihood that the connection with the wireless LAN will be disconnected. Accordingly, the position information of the vehicle 10 and the map information of the access point for the wireless LAN can be used as parameters when selecting which of the wireless LAN communication module 17A and the cellular line communication module 17B to use to receive update data. Thus, the OTA master 11 acquires position information of the vehicle 10 and map information of the access point for the wireless LAN as the traveling circumstances of the vehicle 10. Accordingly, the communication module for receiving update data can be appropriately selected.

(5) When the amount of charge of the mobile information terminal 30 drops when reception of update data via wireless LAN is being performed by tethering of the mobile information terminal 30, there is a likelihood that the tethering will be interrupted, and there is a likelihood of the connection with the wireless LAN being disconnected. Accordingly, the amount of charge of the mobile information terminal 30 can be used as a parameter when selecting which of the wireless LAN communication module 17A and the cellular line communication module 17B to use to receive update data. Thus, the OTA master 11 selects which of the wireless LAN communication module 17A and the cellular line communication module 17B to use to receive update data for the software based on the amount of charge of the mobile information terminal 30. Accordingly, the communication module for receiving update data can be appropriately selected.

(6) When receiving the update data, communication will be more stable when a communication line that has a strong radio wave strength is selected. Thus, the OTA master 11 selects which of the wireless LAN communication module 17A and the cellular line communication module 17B to use to receive update data for the software based on the radio wave strength of the wireless LAN and the radio wave strength of the cellular line. Accordingly, the communication module for receiving update data can be appropriately selected.

Correlation

In S100, S110, and S120 of FIG. 2, the OTA master 11 performs processing of selecting which of the wireless LAN communication module 17A and the cellular line communication module 17B to use to receive the software update data, based on the traveling circumstances of the vehicle 10. In the present embodiment, such an OTA master 11 is an example of a selecting unit and a software management system. Also, the program of the OTA master 11 that executes the processing as the selecting unit is an example of a software management program.

Modifications

Note that the above embodiment can be implemented with the following modifications. The above embodiment and the following modifications can be carried out in combination with each other insofar as no technical contradiction arises.

- In the processing of S100 shown in FIG. 2, the traveling circumstances parameters acquired in order to select a communication line for receiving update data are as follows. That is to say, the parameters are the vehicle speed of the vehicle 10, the traveling area in which the vehicle 10 is traveling, the current position information of the vehicle 10, and the map information of the access point for the wireless LAN that is currently connected to. In addition, a communication line for receiving update data may be selected based on at least one of these parameters. Note that the expression "at least one" as used in the present specification means "one or more" of desired options. As an example, the expression "at least one" as used in the present specification means "only one option" or "both of the two options" when the number of options is two. As another example, the expression "at least one" as used in the present specification means "only one option" or "a combination of any two or more options" when the number of options is three or more.
- Parameters different from the above parameters may be used as the parameters for traveling circumstances that are acquired to select the communication line for receiving update data.
- In the processing of S100 shown in FIG. 2, one of the parameters acquired in order to select a communication line for receiving update data is the radio wave strength of the wireless LAN and the radio wave strength of the cellular line. Acquisition of the radio wave strength of the wireless LAN and the radio wave strength of the cellular line may be omitted.
- In the processing of S100 shown in FIG. 2, one of the parameters acquired in order to select the communication line for receiving update data is the amount of charge of the mobile information terminal 30. Acquisition of the amount of charge of the mobile information terminal 30 may be omitted.
- A communication standard different from Wi-Fi communication may be used as the wireless LAN.

APPENDICES

Technical ideas that can be comprehended from the above embodiment and modifications will be described.

1. A software management system according to an aspect of the present disclosure is a system for a vehicle including a first communication device configured to receive update data of software via a wireless LAN, and a second communication device configured to receive the update data via a cellular line. The software management system includes a selecting unit configured to select which of the first communication device and the second communication device to use to receive the update data, based on a traveling circumstance of the vehicle.

In the above aspect, the selecting unit may be configured to acquire a vehicle speed of the vehicle as the traveling circumstance of the vehicle.

In the above aspect, the selecting unit may be configured to select the second communication device when the vehicle speed is equal to or greater than a predetermined speed.

In the above aspect, the selecting unit may be configured to acquire a traveling area in which the vehicle is traveling as the traveling circumstance of the vehicle.

In the above aspect, the selecting unit may be configured to select the second communication device when the traveling area is an area where a connection with the wireless LAN is able to be established and the connection has a possibility of being disconnected.

In the above aspect, the selecting unit may be configured to acquire position information of the vehicle and map information of an access point for the wireless LAN as the traveling circumstance of the vehicle.

In the above aspect, the selecting unit may be configured to select the second communication device when a distance between the vehicle and the access point is equal to or greater than a predetermined distance.

In the above aspect, the selecting unit may be configured to select the second communication device when the traveling circumstance satisfies a predetermined traveling condition.

In the above aspect, the selecting unit is configured to: acquire a radio wave strength of the cellular line, and select, when the radio wave strength satisfies a predetermined radio wave condition, the second communication device regardless of whether the traveling circumstance satisfies the predetermined traveling condition.

In the above aspect, the selecting unit may be configured to: acquire an amount of charge of a mobile information terminal when the update data is received via the wireless LAN by using tethering of the mobile information terminal, and select, when the amount of charge is equal to or smaller than a predetermined amount of charge, the second communication device regardless of whether the traveling circumstance satisfies the predetermined traveling condition.

What is claimed is:

1. A software management system for a vehicle including a first communication device configured to receive update data of software via a wireless L AN, and a second communication device configured to receive the update data via a cellular line, the software management system comprising:

a processing circuit configured to:

acquire at least one parameter of the vehicle indicating a traveling circumstance of the vehicle;

determine whether the acquired at least one parameter is equal to or greater than a first threshold value;

in response to a determination that the acquired at least one parameter is equal to or greater than the first threshold value, select the second communication device to use to receive the update; and in response to a determination that the acquired at least one parameter is lesser than the first threshold value, select the first communication device to use to receive the update data, wherein when the first communication device is used to receive the update data via a tethering device, the processing circuit is further configured to:

determine whether an amount of charge of the tethering device during reception of the update data is equal to or lesser than a second threshold value, in response to a determination that the amount of charge is equal to or lesser than the second threshold value, select the second communication device to use to receive the update data; and update software of one or more electronic devices of the vehicle using the received update data.

2. The software management system according to claim 1, wherein the processing circuit is configured to acquire a vehicle speed of the vehicle as the traveling circumstance of the vehicle.

3. The software management system according to claim 2, wherein the processing circuit is configured to select the second communication device when the vehicle speed is equal to or greater than the first threshold value.

4. The software management system according to claim 1, wherein the at least one parameter further includes a traveling area in which the vehicle is traveling as the traveling circumstance of the vehicle.

5. The software management system according to claim 4, wherein when the traveling area is used to select the first communication device or the second communication device to use to receive the update data, the processing circuit is configured to select the second communication device when the traveling area is an area where a connection with the wireless LAN is able to be established and the connection has a possibility of being disconnected.

6. The software management system according to claim 1, wherein the at least one parameter further includes position information of the vehicle and map information of an access point for the wireless LAN as the traveling circumstance of the vehicle.

7. The software management system according to claim 6, wherein when the map information of the access point is used to select the first communication device or the second communication device to use to receive the update data, the processing circuit is configured to select the second communication device when a distance between the vehicle and the access point is equal to or greater than a predetermined distance.

8. The software management system according to claim 1, wherein when the first communication device is used to receive the update data via the tethering device, the processing circuit is configured to select the second communication device when the amount of charge of the tethering device is equal to or lesser than the second threshold value regardless of whether the traveling circumstance satisfies a predetermined traveling condition.

9. A software management method that is executed by a processing circuit, for a vehicle including a first communication device configured to receive update data of software via a wireless LAN, and a second communication device configured to receive the update data via a cellular line, the software management method comprising:

acquiring at least one parameter indicating a traveling circumstance of the vehicle;

determining whether the acquired at least one parameter is equal to or greater than a first threshold value;

in response to a determination that the acquired at least one parameter is equal to or greater than the first threshold value, selecting the second communication device to use to receive the update data;

in response to a determination that the acquired at least one parameter is lesser than the first threshold value, selecting the first communication device to use to receive the update data; and when the first communication device is used to receive the update data via a tethering device, the software management method further comprising:

determining whether an amount of charge of the tethering device during reception of the update data is equal to or lesser than a second threshold value, in response to a determination that the amount of charge is equal to or lesser than the second threshold value, selecting the second communication device to use to receive the update data; and updating software of one or more electronic devices of the vehicle using the received update data.

10. A non-transitory storage medium storing instructions that are executable by a processing circuit and that cause the processing circuit to perform functions for managing software of a vehicle including a first communication device configured to receive update data of the software via a wireless LAN and a second communication device configured to receive the update data via a cellular line, the functions comprising:

acquiring at least one parameter indicating a traveling circumstance of the vehicle;

determining whether the acquired at least one parameter is equal to or greater than a first threshold value;

in response to a determination that the acquired at least one parameter is equal to or greater than the first threshold value, selecting the second communication device to use to receive the update data;

in response to a determination that the acquired at least one parameter is lesser than the first threshold value, selecting the first communication device to use to receive the update data; and when the first communication device is used to receive the update data via a tethering device, the processing circuit further performs the functions comprising:

determining whether an amount of charge of the tethering device during reception of the update data is equal to or lesser than a second threshold value, in response to a determination that the amount of charge is equal to or lesser than the second threshold value, selecting the second communication device to use to receive the update data; and updating software of one or more electronic devices of the vehicle using the received update data.

* * * * *